US006385640B1

United States Patent
Yamamoto et al.

(10) Patent No.: US 6,385,640 B1
(45) Date of Patent: May 7, 2002

(54) SWITCHING APPARATUS APPLIED TO A PLURALITY OF INFORMATION PROCESSING SYSTEMS WHICH ARE CLOSED SYSTEMS

(75) Inventors: Rieko Yamamoto; Hiroyuki Yoshida, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/546,897

(22) Filed: Oct. 23, 1995

(30) Foreign Application Priority Data

Mar. 17, 1995 (JP) ............................................. 7-059566

(51) Int. Cl.⁷ ............................................. G06F 15/16
(52) U.S. Cl. ....................................... 709/201; 709/204
(58) Field of Search ........................ 395/200.01, 200.02, 395/200.2, 200.05; 709/201, 204, 203, 206

(56) References Cited

U.S. PATENT DOCUMENTS

| 5,278,955 A | * | 1/1994 | Forté et al. | ............ | 395/200.01 |
| 5,313,581 A | * | 5/1994 | Giokas et al. | ......... | 395/200.05 |
| 5,371,852 A | * | 12/1994 | Attanasio et al. | ...... | 395/200.02 |
| 5,408,607 A | * | 4/1995 | Nishikawa et al. | .... | 395/200.18 |
| 5,465,331 A | * | 11/1995 | Yang et al. | ............ | 395/200.01 |
| 5,490,252 A | * | 2/1996 | Macera et al. | ......... | 395/200.01 |

OTHER PUBLICATIONS

Microsoft Press "Computer Dictionary", pp. 389–390, 1994.*

* cited by examiner

Primary Examiner—Do Hyun Yoo
Assistant Examiner—Gary J. Portka
(74) Attorney, Agent, or Firm—Armstrong, Westerman & Hattori, LLP

(57) ABSTRACT

An switching apparatus including an information sending unit and an information receiving unit. The information sending unit has a selecting block for selecting an information item to be sent to another information system from among information items processed in an information processing system, a specifying block for specifying the information item selected by the selecting block as information to be sent to another information processing system, an extracting block for extracting the information item specified by the specifying block from the information items processed in the information processing system, and a sending block for sending the information item extracted by the extracting block to a predetermined communication system as information to be sent to another information processing system. The information receiving unit has a receiving block for receiving an information item transmitted from the predetermined communication system as information to be sent from another information processing system to the information processing system, and an information supply block for supplying the information item received by the receiving block to the information processing system.

12 Claims, 7 Drawing Sheets

F I G. 1
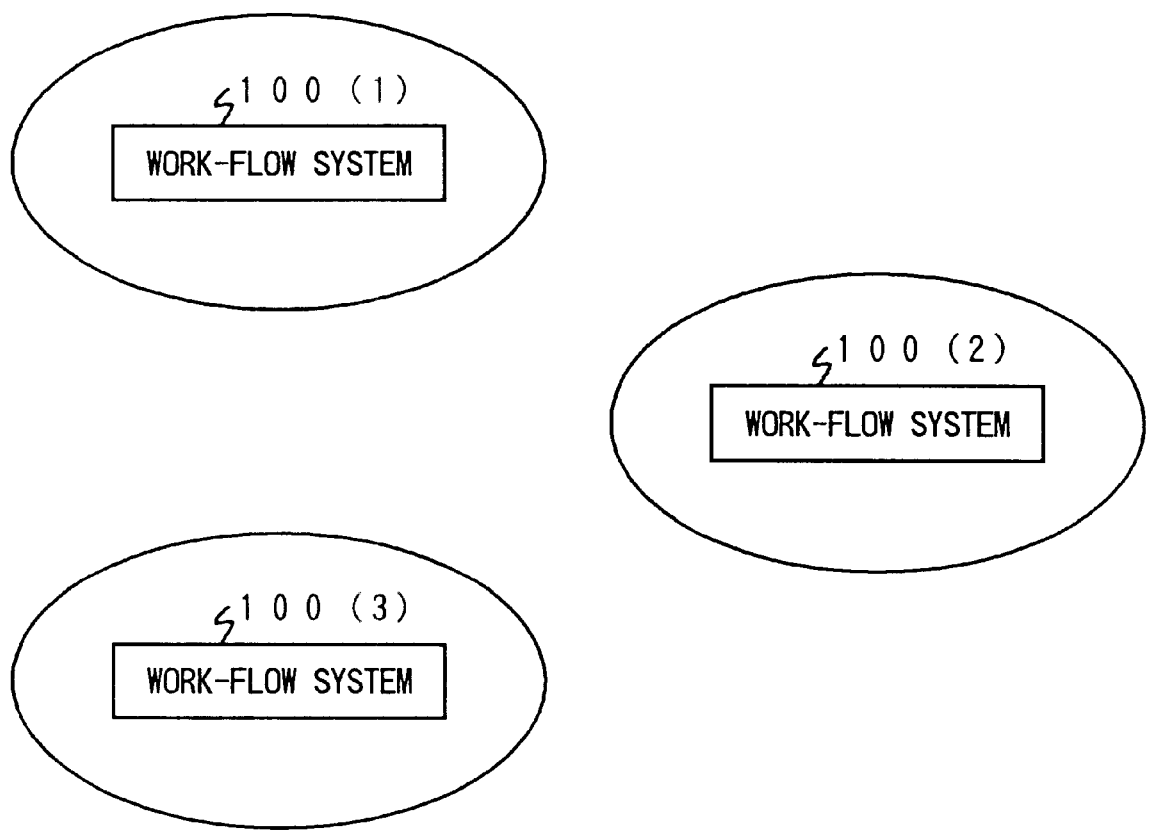

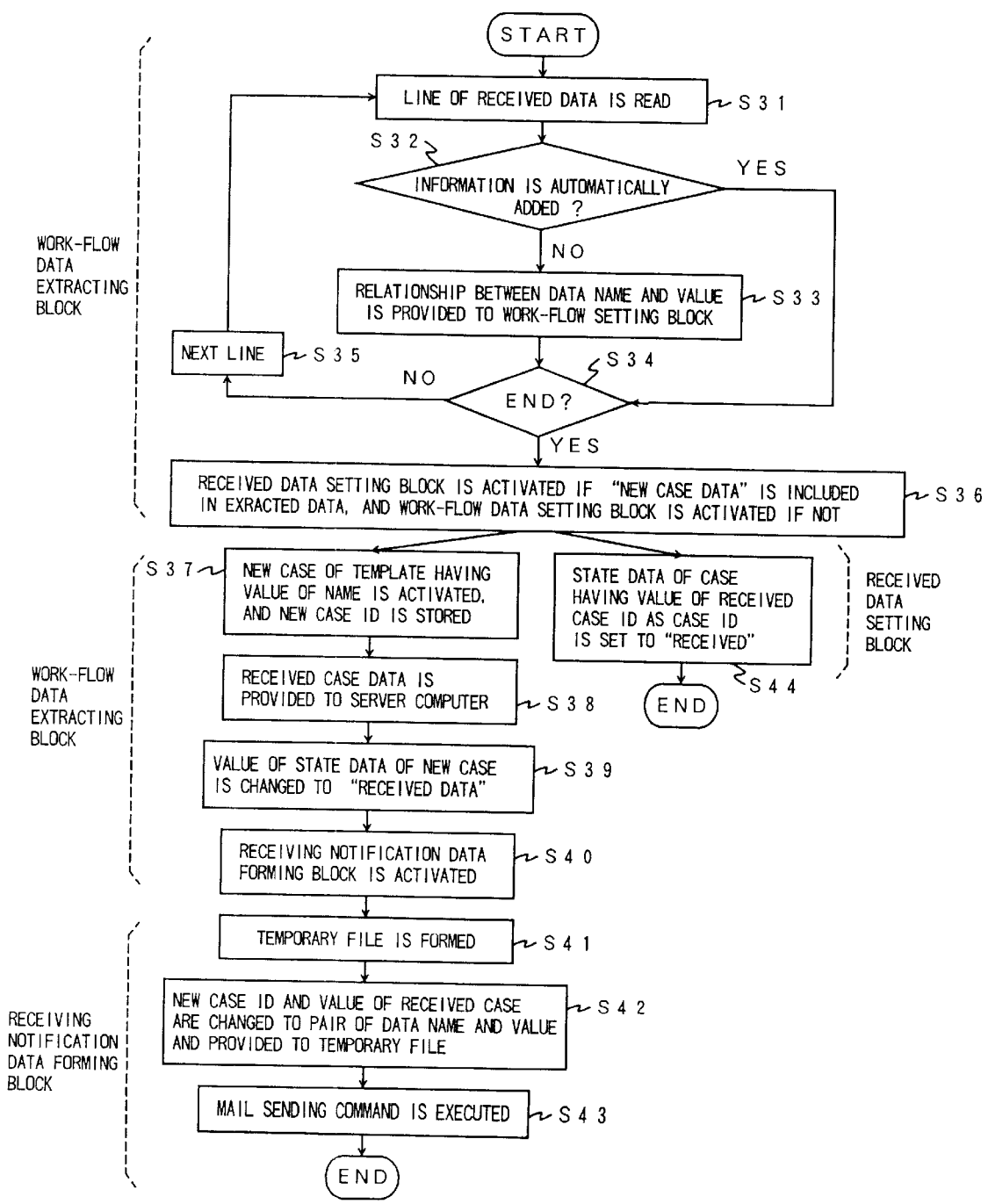

SWITCHING APPARATUS APPLIED TO A PLURALITY OF INFORMATION PROCESSING SYSTEMS WHICH ARE CLOSED SYSTEMS

BACKGROUND OF THE INVENTION (1) Field of the Invention

The present invention generally relates to a switching apparatus for switching a system which should process information from one information processing system to another, and more particularly to a switching apparatus applied to information processing systems, such as work-flow systems having server computers and client computers (client/server architecture), so that work-flow data can be processed in a plurality of work-flow systems which are closed systems.

(2) Description of the Related Art

Conventionally, a work-flow system formed in accordance with the client/server architecture has been proposed. In the work-flow system, a work list which is a list of works for a user is displayed on a screen of each of client computers. Further, forms and documents used to execute a work selected from among the works in the work list are displayed on the screen and editing of the forms and the documents are carried out. Data regarding a work for a user is referred to as work-flow data. The work-flow data is supplied from the server computer to the client computer. Such a work-flow system is a closed system, so that, as shown in FIG. 1, a plurality of work-flow systems 100(1), 100(2) and 100(3) are operated with no connection between them.

There are two types of work-flow systems. The first type is referred to as a single server system and the second type is referred to as a multiserver system. In the single server system, a plurality of client computers are managed by a single server computer. The multiserver system is provided with a plurality of server computers. In the multiserver system, the work-flow data is shared by all the server computers so that work-flow data processed by a server computer can be processed by another server computer. For example, each server computer compares a database managed thereby with a database managed by another server computer, and checks added, deleted and corrected documents. If the difference between contents of the databases managed by the server computers is detected based on the checking result, a process, such as a mediating process, is carried out between the server computers. Thus, each server computer in the multiserver system must have functions different from those of the server computer in the single server system.

In a case where the single server system must be adapted to the multiserver system, server computers each of which is used in the single server system can not be applied to the multiserver system without changes. Each server computer used in the single server system must be adapted so as to be applied to the multiserver system. However, it is difficult to adapt each server computer used in the single server system which has been completed to a server computer applicable to the multiserver system.

SUMMARY OF THE PRESENT INVENTION

Accordingly, a general object of the present invention is to provide a novel and useful switching device to eliminate the disadvantages of the aforementioned prior art.

A first object of the present invention is to provide a sending information specifying unit which can specify, as a data item to be sent to another processing system, a data item out of data items capable of being processed in a processing system which is a closed system such as the single server system.

The above object of the present invention is achieved by a sending information specifying unit comprising: a sending information selecting means for selecting an information item to be sent to another information processing system from among information items processed in an information processing system which is a closed system; and specifying means for specifying the information item selected by the sending information selecting means as information to be sent to another information processing system.

According to the present invention, a data item can be specified, as a data item to be sent to another processing system, out of data items capable of being processed in a processing system which is a closed system such as the signal server system.

A second object of the present invention is to provide an information sending unit applicable to a switching apparatus by which the data item specified by the above sending information specifying system can be shared by a plurality of processing systems which are closed systems such as the single server system.

The second object of the present invention is achieved by an information sending unit comprising: an extracting an means for extracting information item which has been specified as information to be sent by a sending information specifying unit from information items processed in an information processing system which is a closed system; and sending means for sending the information item extracted by the extracting means, as information to be sent to another information system, to a predetermined communication system.

According to the present invention, since the information item specified as information which is to be sent to another information processing system is sent to another information processing system, the information item can be shared by a plurality of information processing systems.

A third object of the present invention is to provide an information receiving unit applicable to a switching apparatus by which the data item specified by the above transmission information specifying system can be shared by a plurality of processing systems which are closed systems such as the single server system.

The third object of the present invention is achieved by an information receiving unit comprising: receiving means for receiving an information item transmitted from a predetermined communication system as information to be sent to an information processing system; and information supply means for supplying the information item received by the receiving means to the information processing system.

According to the present invention, since the information item transmitted from another information processing system is received and is supplied to the information processing system, the information item supplied from another information processing system can be processed in the information processing system.

A fourth object of the present invention is to provide a switching apparatus by which the data item specified by the above transmission information specifying system can be shared by a plurality of processing systems which are closed systems such as the single server system.

The fourth object of the present invention is achieved by a switching apparatus comprising: an information sending unit; and an information receiving unit, the information sending unit having: first extracting means for extracting information item which has been specified as information to be sent by a sending information specifying unit from information items processed in an information processing system which is a closed system; and sending means for sending the information item extracted by the extracting means, as information to be sent to another information system, to a predetermined communication system, the information receiving unit having: receiving means for receiving an information item transmitted from the predetermined communication system as information to be sent from another information processing system to the information processing system; and information supply means for supplying the information item received by the receiving means to the information processing system.

According to the present invention, an information item is sent to another information processing system, and an information item is supplied from another information processing system to an information processing system. Thus, the information item can be shared by a plurality of information processing systems.

BRIEF DESCRIPTION OF THE DRAWINGS

Other objects, features and advantages of the present invention will become apparent from the following detailed description when read in conjunction with the accompanying drawings, in which:

FIG. 1 is a diagram illustrating a concept of work-flow systems which are closed systems;

FIG. 7 is a flowchart illustrating processing procedures in a work-flow data extracting block and a received data setting block in a receiving unit and a processing procedure in a received data setting block in the transmission unit.

DESCRIPTION OF THE PREFERRED EMBODIMENTS

A description will be given of an embodiment of the present invention.

Figure 2:
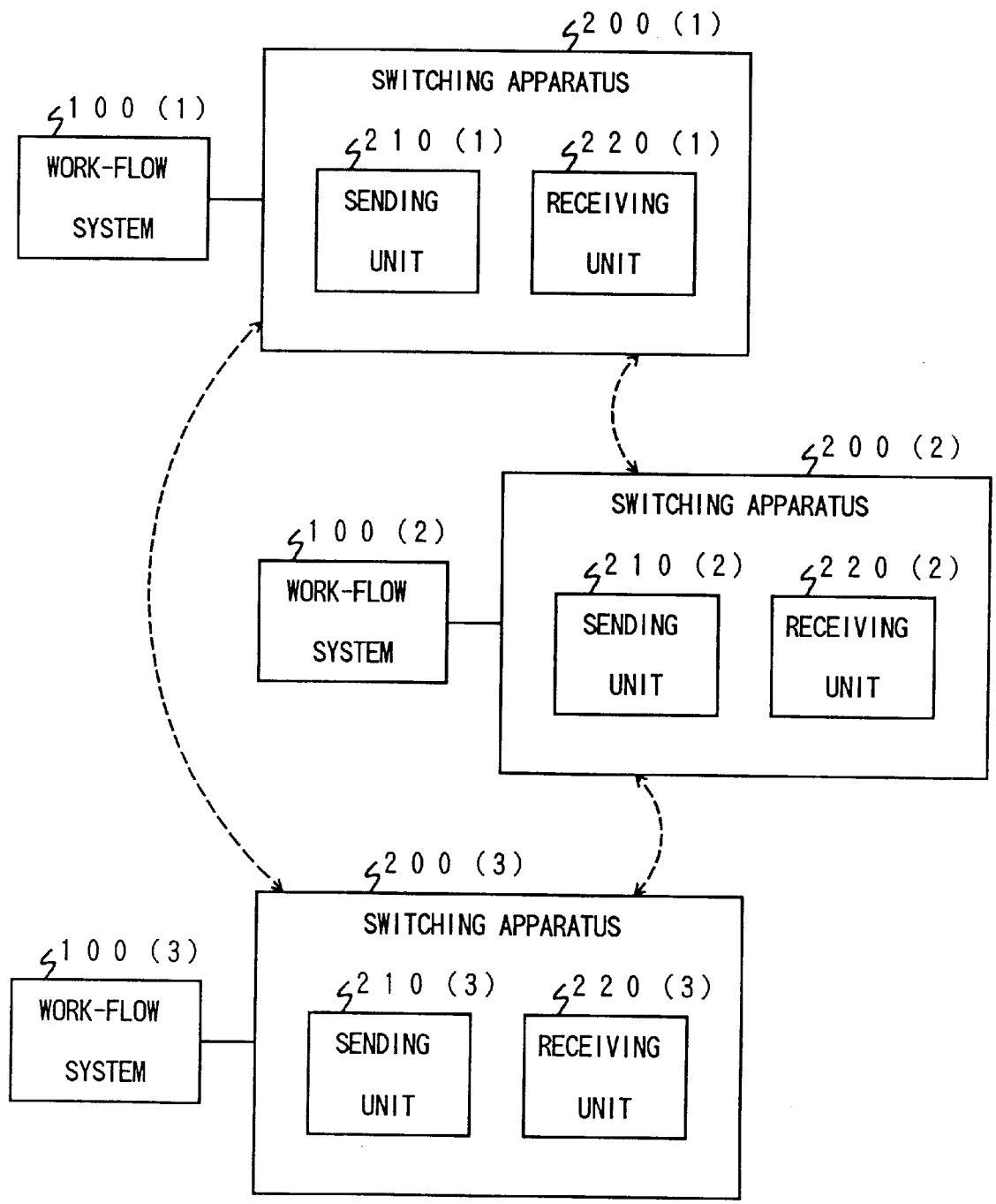
FIG. 2 is a block diagram illustrating an arrangement of information processing systems to which switching apparatus according to an embodiment of the present invention are applied.

In the embodiment of the present invention, a plurality of work-flow systems are connected by switching apparatuses as shown in FIG. 2. Referring to FIG. 2, there are three work-flow systems 100(1), 100(2) and 100(3) which are closed information processing systems. The work-flow systems 100(1), 100(2) and 100(3) are respectively connected with switching apparatuses 200(1), 200(2) and 200(3).

Figure 3:
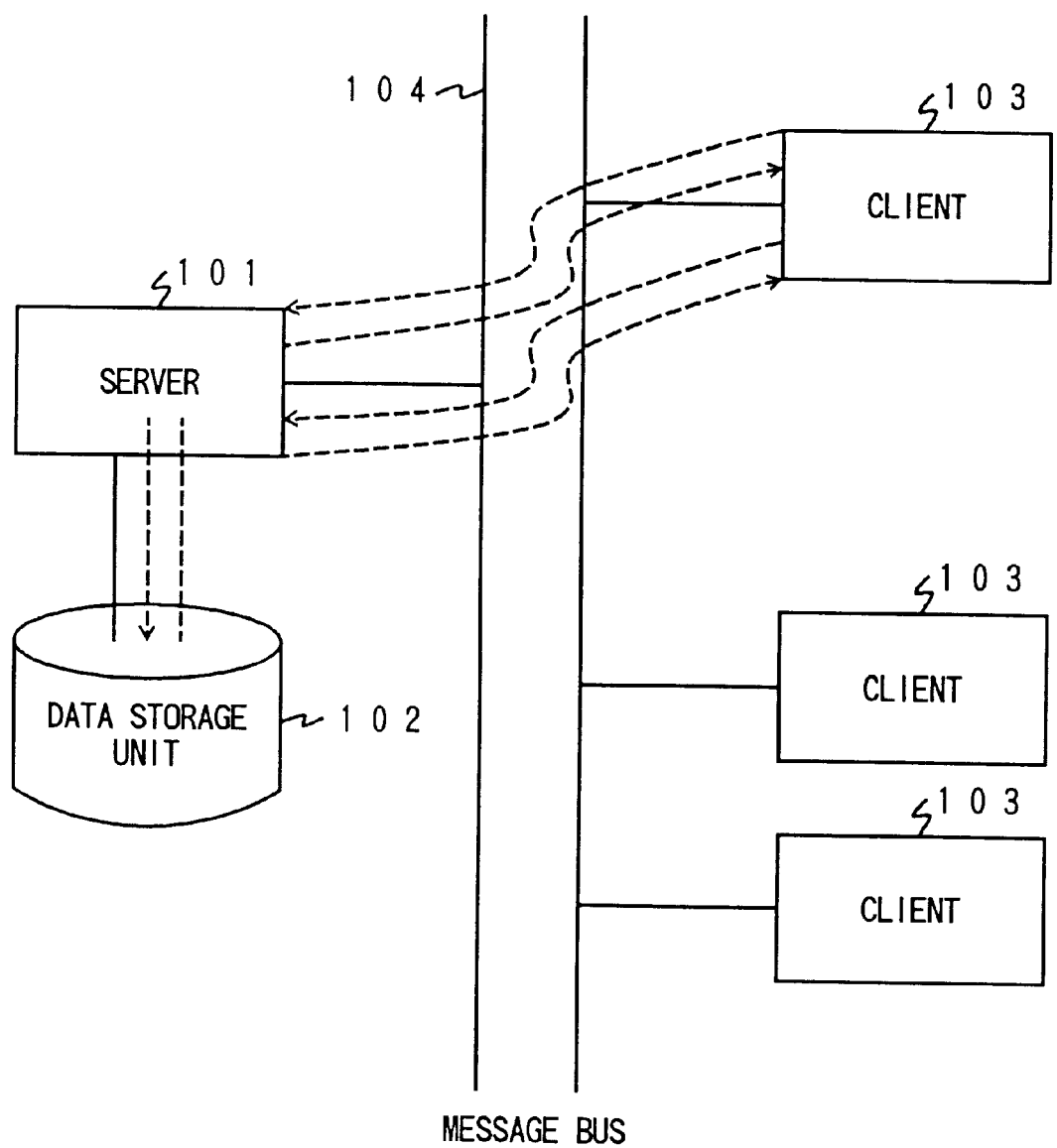
FIG. 3 is a block diagram illustrating a work-flow system which is an example of each of the information processing systems shown in FIG. 2.

Each of the work-flow systems 100(1), 100(2) and 100(3) is formed as the single server system as shown in FIG. 3. Referring to FIG. 3, the work-flow system has a single server computer 101 and a plurality of client computers 103. The server computer 101 and the client computers 103 are connected with each other by a message bus 104 so that communication between the server computer 101 and the respective client computers 103 is performed via the massage bus 104. The server computer 101 manages a data storage unit 102 in which work-flow data capable of being processed in the system is stored. In such the work-flow system, when a client computer 103 is activated by a user, information regarding the user is sent from the activated client computer 103 to the server computer 101. The server computer 101 analyzes the information and makes information regarding works for the user from information (work-flow data) stored in the data storage unit 102. The information made by the server computer 101 is sent from the server computer 101 to the client computer 103. The client computer 103 analyzes the information from the server computer 101 and a list of the works for the user is displayed on a display unit of the client computer 103.

After this, when the user selects a work from among the works in the list displayed on the display unit, the client computer 103 transmits information regarding the selected work to the server computer 101. The server computer 101 then analyzes the information from the client computer 103, retrieves information in the data storage unit 102 and makes information needed to execute the selected work. The information made by the server computer 101 is then sent from the server computer 101 to the client computer 103. The client computer 103 which receives the information from the server computer 101 analyzes the information and performs display of forms and automatic start operation for respective tools.

In the above work-flow system, the work-flow data is formed of a template of a work-flow (a work-flow template) and cases generated on the basis of the template. For example, in a work-flow of a fault form processing, a processing route in accordance with which a fault form is processed in an issuance section and reply sections corresponds to the template. Respective faults correspond to the cases. In this embodiment, all the work-flow systems 100(1), 100(2) and 100(3) have the same work-flow template and the cases are separately managed by the respective work-flow systems 100(1), 100(2) and 100(3).

Figure 4:
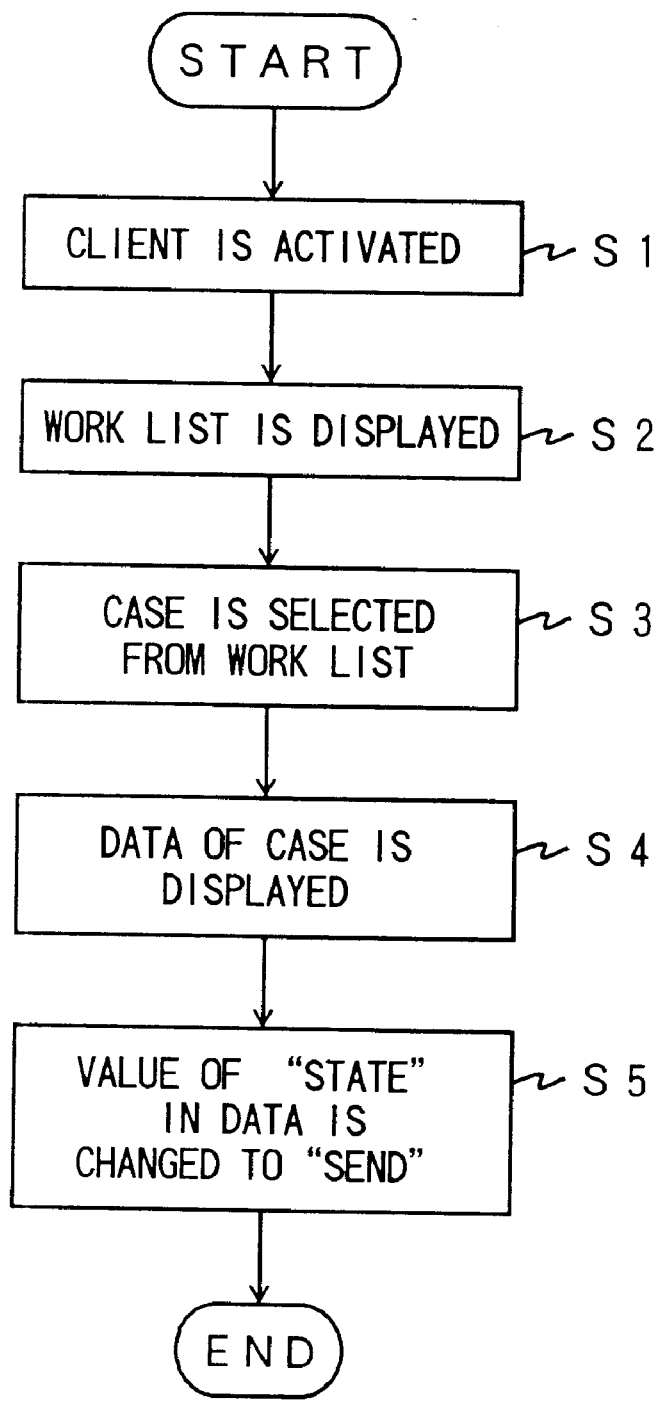
FIG. 4 is a flowchart illustrating a processing procedure in a transmission specifying block.

Each of the client computers 103 specifies information which should be sent to another work-flow system, in accordance with a processing procedure shown in FIG. 4.

Referring to FIG. 4, when a client computer 103 is activated by a user (S1), a work list is displayed on a display screen of the client computer 103 (S2). In this state, when a case to be transmitted to another work-flow system is selected from the work list displayed on the display screen by input operations of a user (S3), internal data of the selected case is read out from the server computer 101 and displayed on the display screen of the client computer 103 (S4). A value of an item "STATE" of the internal data is then set to "Send" indicating that the case should be sent, and the internal data in which the value of the item "STATE" has been set to "Send" is stored in the data storage unit 102 managed by the server computer 101 (S5).

Each of the client computers 103 processes cases which can be treated in the work-flow system including the client computers 103. As to cases, which should be requested to be sent to another work-flow system, out of the cases processed by each of the client computers 103, the value of the item "STATE" in the internal data is set to "Send".

Figure 5:
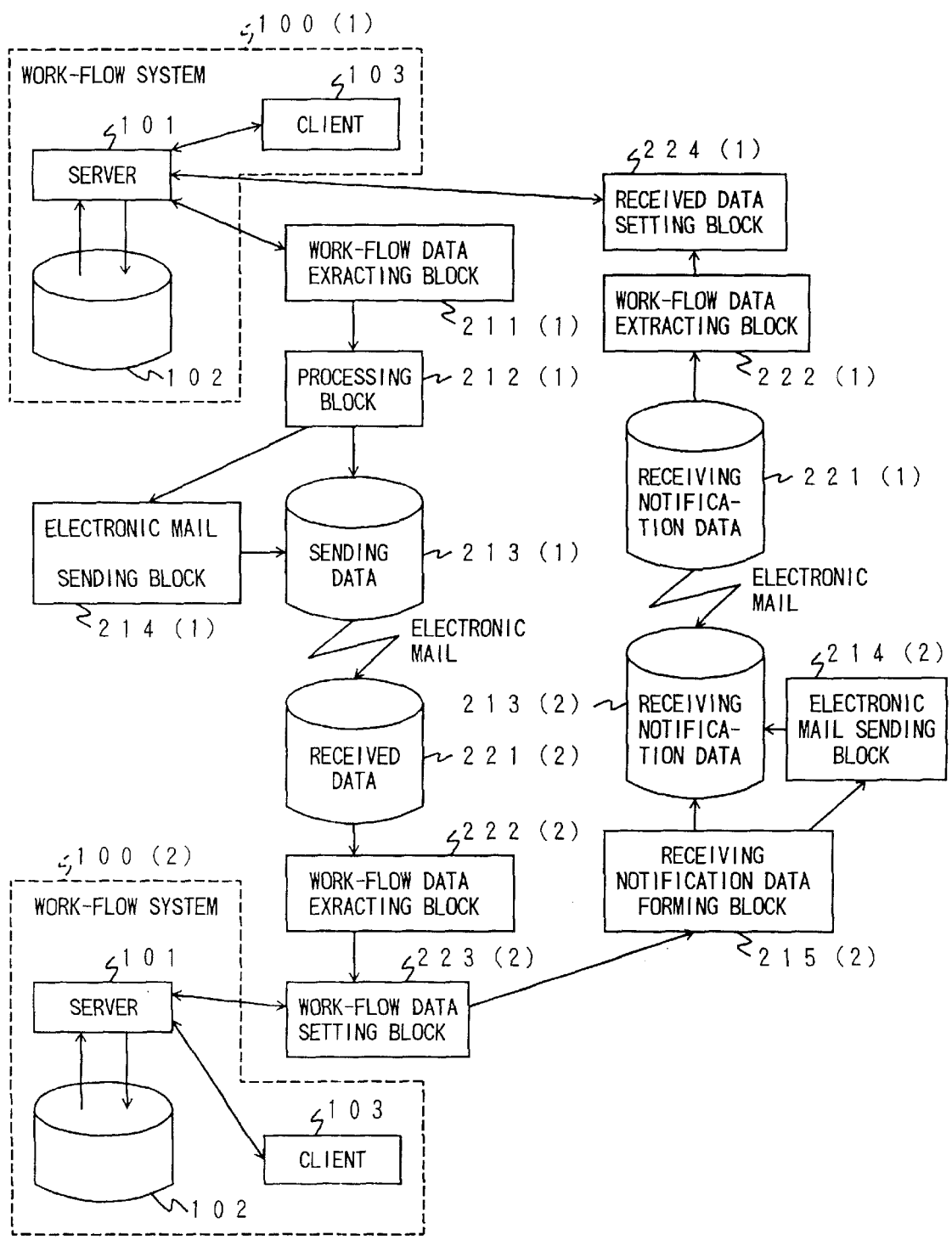
FIG. 5 is a block diagram illustrating a structure of the switching apparatus for the information processing systems.

Each of the switching apparatuses 200(1), 200(2) and 200(3) is functionally formed as shown in FIG. 5. FIG. 5 shows functional structures of the switching apparatuses 200(1) and 200(2) respectively connected to the work-flow systems 100(1) and 100(2) which share information.

The switching apparatuses 200(1) and 200(2) respectively have sending units 210(1) and 210(2) and receiving units 220(1) and 220(2) as shown in FIG. 2. Referring to FIG. 5, the sending unit 210(1) of the switching apparatus 100(1) has a work-flow data extracting block 211(1), a processing block 212(1), an electronic mail sending block 214(1) and a sending data storage block 213(1). The work-flow data extracting block 211(1) communicates with the server computer 101 of the work-flow system 100(1), and extracts a case which should be sent to the work-flow system 100(2). The processing block 212(1) converts the case extracted by the work-flow data extracting block 211(1) into information which can be sent by the electronic mail sending block 214(1). The process in the work-flow data extracting block 211(19 and the processing block 212(1) is performed in accordance with a procedure shown in FIG. 6.

Figure 6:
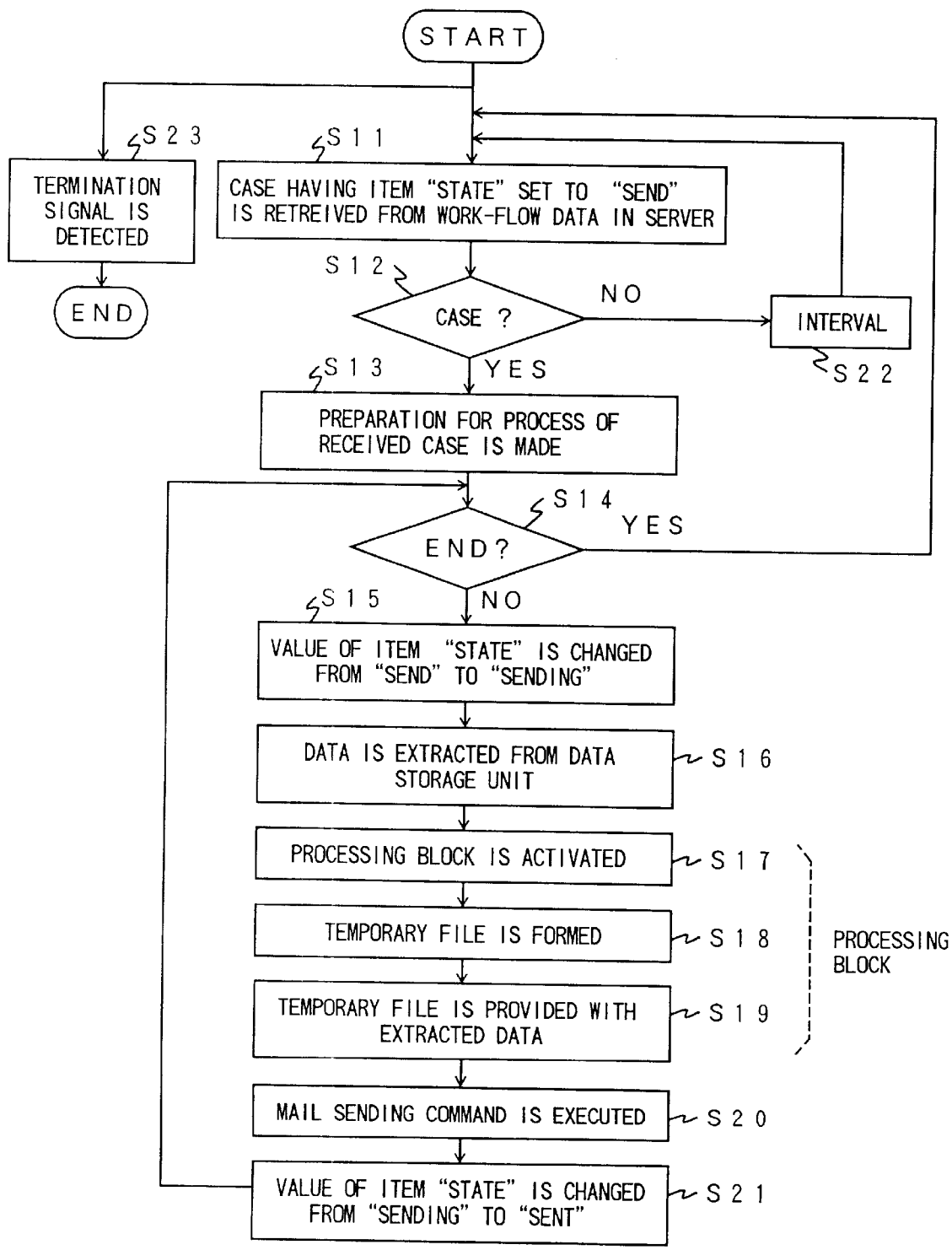
FIG. 6 is a flowchart illustrating processing procedures in a work-flow data extracting block and a processing block in a transmission unit.

Referring to FIG. 6, when the work-flow data extracting block 211(1) is activated, a case in which the value of the item "STATE" has been set to "Send" is retrieved from all the work-flow data items stored in the data storage unit 102 managed by the server computer 101 (S11). It is then determined, based on the result obtained in step S11, whether or not there is such the case (S12). If there is not such a case, the work-flow data extracting block 211(1) repeatedly carries out the steps S11 and S12 at predetermined intervals (e.g., 300 seconds) until a termination signal is supplied thereto (S22).

On the other hand, if there is the case in which the value of the item "STATE" has been set to "Send", preparations for a process of the case are made (S13). After this, the process is carried out as follows.

The work-flow data extracting block 211(1) communicates with the server computer 101 so that the value of the item "STATE" in the internal data corresponding to the case is changed to "Sending" indicating that the case is being set at the present time (S15). Data needed to execute the case, such as the name of the work-flow template, an identification of the case, an operator's name and an active stage, is retrieved from the data storage unit 102 managed by the server computer 101 (S16). The retrieved data (the extracted data) is output as a sending data file. The sending data file is, for example, represented as follows.

| Sending Process Instance | #108 |
| --- | --- |
| To | |
| Name | TFromCheck |
| ShortDesk | Send/Receive Sample |
| LongDesk | A template of cases (has been sent) |
| ActiveStage | MgrApprove |
| po created | test1 |
| ordered | test2 |
| pr number | Send/Receive Sample |
| po number | 12345 |
| dept approval | 11/09 09:54 |
| status | Sending |
| cost | $ 1000 |
| received | yuki |
| description | A template of cases for the sending/receiving daemons |
| requester | lisun |

When such a sending data file is obtained, the work-flow data extracting block 211(1) activates the processing block 212(1) and supplies the sending data file to the processing block 212(1) (S17). Then, the processing block 212(1) starts to form a temporary file from the received sending data file (S18). The processing block 212(1) analyzes the extracted data formed in the sending data file line-by-line. The sending data file is then converted into the temporary file having a format which can be sent by the sending unit 210(1), and the temporary file is stored in the sending data storage block 213(1) (S19). After this, in response to the termination of the process in the processing block 212(1), the electronic mail sending block 214(1) adds to the temporary file a sending address identifying a destination and executes an electronic mail command (S20). In the case where the sending address (address) and a title of a mail (Subject) are previously decided, an electronic mail sending command in Unix is, for example, represented as follows.

*exec echo* $TempFile |mail–s $Subject $address

The processing block 212(1) has a function for providing an address to a sending command as described above. For example, an address description file name is formed, and contents thereof is provided as the address to the sending command. The address identifies a server computer in the work-flow system 100(2) to which the data should be sent. Further, the electronic mail sending block 214(1) automatically adds information regarding a sender, a sending time and a sending machine to the sending command. The data output as the electronic mail is supplied to the receiving unit 220(2) of the switching apparatus 200(2) connected to the work-flow system 100(2) by a known electronic mail system.

When the mail sending command is executed, the sending unit 210(1) communicates with the server computer 101 so that the value of the item "state" of the data corresponding to the case is changed to "Sent" indicating that the data has been sent. As a result, the value of the item "state" of the data corresponding to the case stored in the data storage unit 102 managed by the server computer 101 is changed to "Sent" (S21).

Returning to FIG. 5, the receiving unit 200(2) of the switching apparatus 200(2) connected to the work-flow system 100(2) has a received data storage block 221(2), a work-flow data extracting block 222(2) and a work-flow data setting block 223(2). The received data storage block 221(2) temporarily stores data which is received as an electronic mail. The work-flow data extracting block 222(2) extracts original work-flow data from the received data. The work-flow data setting block 223(2) sets the work-flow data extracted by the work-flow data extracting block 222(2) in the work-flow system 100(2). In addition, the sending unit 210(2) of the work-flow system 100(2) has a receiving notification data forming block 215(2), an electronic mail sending block 214(2) and a sending data storage block 213(2).

In the receiving unit 220(2), when an electronic mail is received and a receiving file is stored in the receiving data storage block 221(2), the work-flow data extracting block 222(2) is activated. For example, in a case where an electronic mail is received at an address "workflow *.*.*" in Unix, to execute a receiving command of the electronic mail, a file named "forward" is prepared in a home directory of the user ID "workflow". In the file, "|a command name of the work-flow data extracting block" is described as follows.

"|project/process/PASPHOME/bin/inputmail"

When the work-flow data extracting block 222(2) is activated, the process is executed in accordance with a procedure shown in FIG. 7.

Referring to FIG. 7, the work-flow data extracting block 222(2) reads a received file stored in the received data storage bock 221(2) line-by-line (S31). It is determined whether or not information of each line is information which was automatically added by the receiving unit 220(2)(S32). A reading operation for the received file depends on decisions between the work-flow data extracting block and the processing block. If it is determined that the read information is not the information added in the receiving operation, a relationship between the data name and the values is converted so that the read information can be supplied to the work-flow data setting block 223(3) (S33). On the other hand, if it is determined that the read information is the information added in the receiving operation, the read information is not processed. The above process is repeated until the information of the last line is completed (S34, S35, S31, S32 and S33). As a result, the information added in the received operation is removed from the received file, so that the work-flow data is extracted from the received file.

After the above process to all the lines is completed, if "new case data" (a name and a value) is included in the extracted data, the received data setting block is activated as will be described later, and if not, the work-flow data setting block 223(2) is activated and relationships between all names of data and values are provided to the work-flow data setting block 223(2) (S36).

The work-flow data setting block 223(2) which has been activated activates a new case in a template having a value of a data name "Name" (which is a name of a work-flow template) and a "new case ID" is stored (S37). The contents of the new case data are provided to the server computer 101 of the work-flow system 100(2) (S38). As a result, new work-flow data is set in the server computer 101 in the work-flow system 100(2). In addition, the work-flow data setting block 223(2) communicates with the sever computer 101 so that the value of the state is changed to "RECEIVED DATA" (S39).

According to the above process, the work-flow data which has been managed by the server computer 101 of the work-flow system 100(1) is managed by the server 101 of the other work-flow system 100(2). As a result, a work of a case corresponding to the work-flow data can be continuously performed in a client computer 103 of the other work-flow system 100(2).

After this, the receiving notification data forming block 215(2) in the sending unit 210. Information including the new case ID, the received case ID, the electronic mail receiving address, the electronic mail sending source address is then provided from the work-flow data setting block 223(2) to the receiving notification data forming block 215(2) (S40). The receiving notification data forming block 215(2) stars to form a temporary file (S41). The temporary file in which the names and values of the new case ID and the received case ID are paired as shown below is stored in the sending data storage block 214(2).

Receiving Process Instance #108
New Process Instance #111

When such the temporary file is stored in the sending data storage block 213(2), the electronic mail sending block 214(2) executes a mail sending command in which the contents of the temporary file is provided as a mail body, the electronic mail receiving address is set as a sending source and the electronic mail sending source address is set as a destination (S43). As a result, the receiving notification data file as described above is transmitted to the receiving unit 220(1) of the switching apparatus 200(1) connected to the work-flow system 100(1).

Returning to FIG. 5, the receiving unit 220(1) of the switching apparatus 200(1) connected to the work-flow system 100(1) has a received data storage block 221(1), a work-flow data extracting block 222(1) and a received data setting block 224(1).

The file (a received file) which is transmitted as an electronic mail is stored in the received data storage block 213(1), and the work-flow data extracting block 222(1) executes steps S31–S35 shown in FIG. 7 in the same manner as in the above case. In this case, since the "new case data" is included in the received data (e.g., New Process Instance #111), the work-flow data extracting block 222(1) recognizes that the received data is the receiving notification data indicating that the work-flow data has been normally received. As a result, the received data setting block 224(1) is activated, and the receiving notification data is supplied to the received data setting block 224(1) (S36). After this, the received data setting block 224(1) communicates with the server computer 101 of the work-flow system 100(1) so that the state data of a case having a case ID equal to the value of the "received case ID" (e.g., Receiving Process Instance #108) is changed to "RECEIVED" (S44).

As a result, the server computer 101 of the work-flow system 100(1) manages the case identified by the case ID as a case which is continuously processed in the other work-flow system 100(2).

In the work-flow system 100(1) which is a sending source of the work-flow data, the client computer 103 in which work-flow to be transmitted has been specified displays, on the screen, information indicating that the work-flow data is in a "Send" state which is a state where the work-flow data is specified as data to be transmitted. In addition, when the work-flow data extracting block 211(1) is activated, information indicating that the work-flow data to be extracted is in a "Sending" state which is a state where the data is being transmitted is displayed on the screen of the client computer 103. Further, when the process in the processing block 212(1) is terminated, information indicating that the work-flow data which has been extracted is in a "Sent" state which is a state where the data has been sent is displayed on the screen of the client computer 103. In the work-flow system 100(2) which should receive the work-flow data, when the client computer 103 processes the received work-flow data, information indicating that data to be processed is "work-flow data received from the other system" is displayed on the screen of the client computer 103. Further, In the work-flow system (1) which has transmitted the work flow data, when the receiving notification data is supplied, the client computer 103 in which the work-flow data relating the receiving notification data is selected displays, on the screen, information indicating that the work-flow data is in a state "Received" which is a state where the data has been received in the other work-flow system.

As has been described above, according to the present embodiment, the client computer 103 of the work-flow system 100(1) specifies work-flow to be set to the other work-flow system 100(2). The switching apparatus 200(1) then extracts the work-flow data which has been specified by the client computer 103 from work-flow data managed by the server computer 101 of the work-flow system 100(1). The work-flow data extracted by the switching apparatus 200(1) is transmitted to the switching apparatus 200(2) connected to the other work-flow system 100(2). The switching apparatus 200(2) supplies the received work-flow data to the other work-flow system 100(2). As a result, the work-flow data which has been managed by the server computer 101 of the work-flow system 100(1) is further managed by the server computer 101 of the other work-flow system 100(2). A work of a case corresponding to the work-flow data is continuously executed in the other work-flow system 100(2).

In the above embodiment, since the structure of the switching apparatus is in accordance with the processing flow with reference to FIG. 5, it appears that the structure of the switching apparatus 200(1) differs from that of the switching apparatus 200(2). However, actually, the respective switching apparatus 200(1) and 200(2) have the same structure. That is, each of the switching apparatuses 200(1), 200(2) and 200(3) has the sending unit 210 having the work-flow data extracting block 211, the processing block 212, the sending data storage block 213, the electronic mail sending block 214 and the receiving notification data forming block 215 and the receiving unit 220 having received data storage block 221, the work-flow data extracting block 222, the work-flow data extracting block 222, the work-flow data setting block 223 and the received data setting block 224.

In addition, in the above embodiment, the respective client computers 103 can carry out the process (see FIG. 4) for specifying the work-flow data, as data to be transmitted to the other work-flow system 100(2), managed by the server computer 101 of the work-flow system 100(1). However, the present invention is not limited to this. For example, another external unit may control, via the message bus 104, the state of the server computer 101. In addition, means for performing the communication among the switching apparatuses 200(1), 200(2) and 200(3) is not limited to the electronic mail system. The communication can be performed using, for example, the dedicated line or the LAN.

The application of the preset invention is not limited to the work-flow systems as has been described above. The present invention can be applied to general information processing systems which are closed systems.

In a case where a work-flow is formed of a number of working steps, the respective steps may have a state variable. In this case, a case and working steps to be sent are specified. Pairs of the names of the working steps and values of the "state" and the sending source address are added to the sending file described above. The server computer of the work-flow system receiving data executes the new case. When the last working step in which the value of the "state" is set to "Received data" is terminated, the work-flow data extracting block is activated. After the execution of the working steps specified as data to be transmitted is completed and the work-flow data extracting block is activated, the contents of the new case are provided in the sending file and an electronic mail to which the received case ID is added is transmitted to the sending source address. In the sending source, the contents of data identified by the received case ID is changed to the contents of the data identified by the new case ID.

The present invention is not limited to the aforementioned embodiments, and variations and modifications may be made without departing from the scope of the claimed invention.

What is claimed is:

1. A switching apparatus comprising:
an information sending unit; and
an information receiving unit, said information sending unit having:
first extracting means for extracting an information item to which state information has been added by a sending information specifying unit from information items processed in a first information processing system which is a closed system operating asynchronously with respect to a second information processing system, the state information indicating that the information item is to be sent; and sending means for sending the information item extracted by said extracting means to a predetermined communication system, said information receiving unit comprising:

receiving means for receiving an information item transmitted from said predetermined communication system as information to be sent from said first information processing system to said second information processing system; and information supply means for supplying the information item received by said receiving means to said second information processing system, wherein said receiving means receives information including the information item to be sent to said second information processing system and information required for transmission by said predetermined communication system, and wherein said information supply means comprises:

extracting means for extracting the information item to be sent to said second information processing system from the information received by said receiving means; and information setting means for setting the information item extracted by said extracting means so that the extracted information item can be processed by said second information processing system.

2. The switching apparatus as claimed in claim 1, wherein said sending means comprises:

processing means for converting a format of the information item extracted by said first extracting means into a format which can be transmitted using said predetermined communication system; and storage means for storing information obtained by said processing means as a temporary file, said sending means sending the temporary file stored in said storage means.

3. The switching apparatus as claimed in clam 1, wherein said receiving means receives information including the information item to be sent to said first information processing system and information required for transmission by said predetermined communication system, and wherein said information supply means comprises:

second extracting means for extracting the information item to be sent to said first information processing system from the information received by said receiving means; and information setting means for setting the information item extracted by said second extracting means so that the extracted information item can be processed by said first information processing system.

4. The switching apparatus as claimed in claim 1 further comprising:

notification data forming means for forming notification data indicating that the information item has been received by said first information processing system when said information supply means of said information receiving unit supplies an information to said first information processing system, wherein said information sending unit further has:

notification data sending means for sending the notification data formed by said notification data forming means to said predetermined communication system as data to be sent to said first information processing system which is a sending source of the information item.

5. The switching apparatus as claimed in claim 1, wherein said information receiving unit has notification data receiving means for receiving notification data from said predetermined communication system, the notification data indicating that an information item has been received by said second information processing system, said switching apparatus further comprising:

received data setting means for analyzing the notification data received by said notification data receiving means and setting a value in the information item which has been specified as information to be sent, the value indicating that information has been received.

6. The switching apparatus as claimed in claim 1, wherein said first and second information processing systems are formed in accordance with a client/server architecture.

7. A switching apparatus comprising:

an information sending unit; and an information receiving unit, said information sending unit comprising:

selecting means for selecting an information item to be sent to a second information system from among information items processed in a first information processing system operating asynchronously with respect to said second information processing system;

specifying means for adding state information to the information item selected by said selecting means, the state information indicating that the information item is to be sent to said second information processing system;

extracting means for extracting the information item to which state information has been added from the information items processed in said first information processing system; and sending means for sending the information item extracted by said extracting means to a predetermined communication system as information to be sent to said second information processing system, said information receiving unit comprising:

receiving means for receiving an information item transmitted from said predetermined communication system as information to be sent from said first information processing system to said second information processing system; and information supply means for supplying the information item received by said receiving means to said second information processing system, wherein said receiving means receives information including the information item to be sent to said second information processing system and information required for transmission by said predetermined communication system, and wherein said information supply means comprises:

extracting means for extracting the information item to be sent to said second information processing system from the information received by said receiving means; and information setting means for setting the information item extracted by said extracting means so that the extracted information item can be processed by said second information processing system.

8. The switching apparatus as claimed in claim 7, wherein said first and second information processing systems are formed in accordance with a client/server architecture.

9. The switching apparatus as claimed in claim 7 further comprising:

indicating means for, when said extracting means is activated, indicating that the information item selected by said selecting means is being sent to said second information processing system.

10. The switching apparatus as claimed in claim 7 further comprising:

second indicating means for, when the information item which should be sent by said sending means has been prepared, indicating that the information item selected by said selecting means has been sent to said second information processing system.

11. The switching apparatus as claimed in claim 7 further comprising:

third indicating means for indicating that the information item supplied to said first information processing system is information which has been received by said receiving means.

12. The switching apparatus as claimed in claim 5 further comprising:

indicating means for indicating that the information item in which the value is set by said received data setting means has been received.

\* \* \* \* \*